United States Patent [19]
Hirth et al.

[11] Patent Number: 5,734,710
[45] Date of Patent: Mar. 31, 1998

[54] COMMUNICATION SYSTEM HAVING A SERVICE FEATURE WHICH CAN BE ACTIVATED AND/OR DEACTIVATED

[75] Inventors: Peter Hirth, Erlangen; Hans-Dietmar Schulz, Darmstadt, both of Germany

[73] Assignee: U.S. Philips Corporation, New York, N.Y.

[21] Appl. No.: 502,982

[22] Filed: Jul. 17, 1995

[30] Foreign Application Priority Data

Jul. 19, 1994 [DE] Germany .................. 44 25 395.8

[51] Int. Cl.[6] .................................... H04M 3/42
[52] U.S. Cl. .................. 379/229; 379/201; 379/207; 379/422
[58] Field of Search ............... 379/201, 74, 202, 379/207, 211, 221, 229, 230, 232, 234, 102, 103, 104, 105, 106, 107, 422, 77, 361

[56] References Cited

U.S. PATENT DOCUMENTS

| | | | |
|---|---|---|---|
| 4,926,461 | 5/1990 | Kuok | 379/77 |
| 4,949,372 | 8/1990 | Steele | 379/74 |
| 5,008,930 | 4/1991 | Gawrys et al. | 379/211 |
| 5,012,511 | 4/1991 | Hanle et al. | 379/211 |
| 5,062,133 | 10/1991 | Melrose | 379/102 |
| 5,131,024 | 7/1992 | Pugh et al. | 379/211 |
| 5,247,571 | 9/1993 | Kay et al. | 379/230 |
| 5,329,578 | 7/1994 | Brennan et al. | 379/211 |
| 5,355,404 | 10/1994 | LeDuc et al. | 379/201 |
| 5,404,396 | 4/1995 | Brennan | 379/201 |
| 5,416,835 | 5/1995 | Lee | 379/230 |
| 5,418,844 | 5/1995 | Morrisey et al. | 379/230 |
| 5,450,482 | 9/1995 | Chen et al. | 379/230 |
| 5,467,388 | 11/1995 | Redd, Jr. et al. | 379/211 |
| 5,490,214 | 2/1996 | Straitiff et al. | 379/361 |
| 5,544,236 | 8/1996 | Andruska et al. | 379/201 |

*Primary Examiner*—Harry S. Hong
*Assistant Examiner*—Scott Wolinsky
*Attorney, Agent, or Firm*—Steven R. Biren

[57] ABSTRACT

The invention relates to a communication system comprising a first subscriber line for a first user terminal to which subscriber line a service feature functioning in a service switching point is assigned, which feature can be activated and/or deactivated from the first subscriber line by the first user terminal. A remote control of the first user terminal via a second user terminal of a second subscriber line is provided to activate and/or deactivate the service feature.

4 Claims, 1 Drawing Sheet

COMMUNICATION SYSTEM HAVING A SERVICE FEATURE WHICH CAN BE ACTIVATED AND/OR DEACTIVATED

BACKGROUND OF THE INVENTION

1. Field of the Invention

The invention relates to a communication system comprising a first subscriber line for a first user terminal to which subscriber line a service feature functioning in a service switching point is assigned, which feature can be activated and/or deactivated from the first subscriber line by the first user terminal.

2. Discussion of the Related Art

In many switching networks, especially the public telephone network, a service feature (i.e. a function of the switching network surpassing its basic functions) performed in a service switching point, such as, for example, the call rerouting for subscriber lines, can be activated or deactivated only from a user terminal of the particular subscriber line to which the service feature is assigned. After the service feature has been activated, the function corresponding to the service feature is rendered available by the corresponding service switching point of the switching network. If the possessor of the subscriber line to which the service feature is assigned is situated at the location of another subscriber line, he cannot activate or deactivate from there the service feature assigned to his own subscriber line. This is disadvantageous especially when the possessor goes from a location of a second subscriber line to the location of a third subscriber line. A call rerouting to the third subscriber line from the location of the second subscriber line is then impossible, for example.

DE-PS 22 09 617 has described the method of remote controlled setting, modifying and releasing a call rerouting in a telephone network comprising a plurality of centrally controlled systems. However, this method is based upon a telephone network in which it is possible from one subscriber line also to activate directly in one of the centrally controlled systems (service switching points) a call rerouting assigned to another subscriber line.

SUMMARY OF THE INVENTION

It is an object of the invention to improve the communication system of the type defined in the opening paragraph.

The object is achieved in that a remote control of the first user terminal by a second user terminal of a second subscriber line is provided for activating and/or deactivating the service feature.

In a simple manner it is thus possible to activate/deactivate the service feature relating to the first subscriber line from the location of the second subscriber line. Only user terminal extensions which can be realized in an inexpensive manner are then necessary. A modification of the service switching point, in which the service feature works, may be omitted.

In another embodiment of the invention a transmission is effected of signalling information via the switching network from a switching element of the second user terminal to a switching element of the first user terminal to effect a transmission of signalling information from the first user terminal to the service switching point to activate/deactivate the service feature.

The remote control of the first user terminal of the first subscriber line from the second subscriber line is thus made possible in a simple manner. The service feature can be activated/deactivated by means of the customary service switching points and by the user terminals that have been extended only by the switching elements, which user terminals may further maintain their original structures.

The invention may furthermore be embodied in that the switching elements are provided as add-on elements of the first and second user terminals.

User terminals customary so far can still be used in this manner. The switching elements are then, for example, acoustically coupled to the user terminals. But also other types of coupling, such as electrical, acoustic or optical coupling are possible.

A further embodiment of the invention provides that, after the service feature has been activated/deactivated, a transmission of a first acknowledge signal takes place from the service switching point to the first user terminal and, after that, the transmission of the second acknowledge signal from the first user terminal to the second user terminal by means of the switching elements.

In a simple manner there is thus ensured that activating/deactivating the service feature in the service switching point has an effect on the switching element of the second user terminal, is confirmed there and the subscriber activating or deactivating the service feature via the second user terminal can receive an acknowledgement.

These and other aspects of the invention will be apparent from and elucidated with reference to the embodiments described hereinafter.

DETAILED DESCRIPTION OF THE PREFERRED EMBODIMENTS

Figure 1:
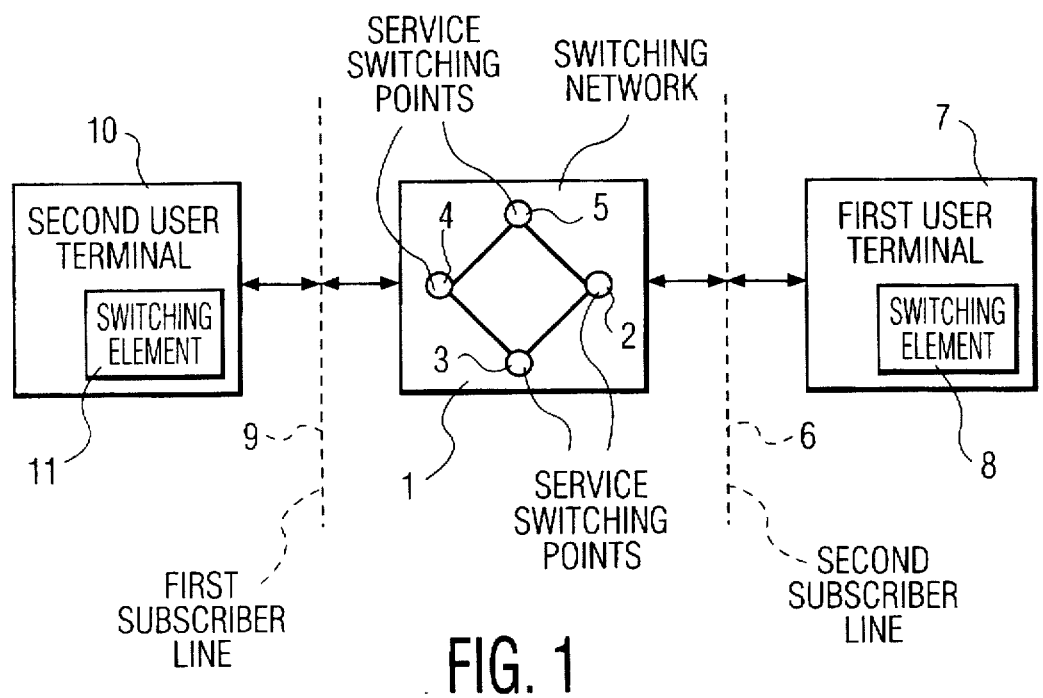
FIG. 1 shows a communication system with two connected user terminals.

In FIG. 1 is shown a communication system comprising a switching network 1 with a plurality of exemplary service switching points 2, 3, 4 and 5. In the communication system a first user terminal 7 is coupled to the switching network 1 via a first subscriber line 6. The user terminal 7 includes a switching element 8 which is integrated with the first user terminal 7 or arranged as an add-on module of the first user terminal 7. A second user terminal 10 is coupled to the switching network 1 via a second subscriber line 9. The second user terminal 10 includes another switching element 11 which is either integrated with that user terminal 10 or arranged as an add-on module of the second user terminal 10.

A service feature such as, for example, the call rerouting for the subscriber line 6 and working in the service switching point 2 can be activated, so that calls destined for the subscriber line 6 are rerouted. However, the service feature can be activated for the first subscriber line 6 only from the first subscriber line 6 itself by the user terminal 7. If the possessor of the first subscriber line 6 goes to the location of the second subscriber line 9, he will activate prior thereto the service feature "call rerouting" in the service switching point 2 via the first user terminal 7, so that calls are rerouted from the subscriber line 6 to the subscriber line 9.

For the case where the possessor wants to go from the location of the subscriber line 9 to the location of a third subscriber line (not shown), it is possible when implementing the invention that the first user terminal 7 is remote controlled by the second user terminal 10 in such a way that the service feature "call rerouting" for the subscriber line 6 can also be activated from the second subscriber line 9 via the second user terminal 10. Especially in public switching networks such a remote controlled activation of the service feature "call rerouting" is often impossible.

Figure 2:
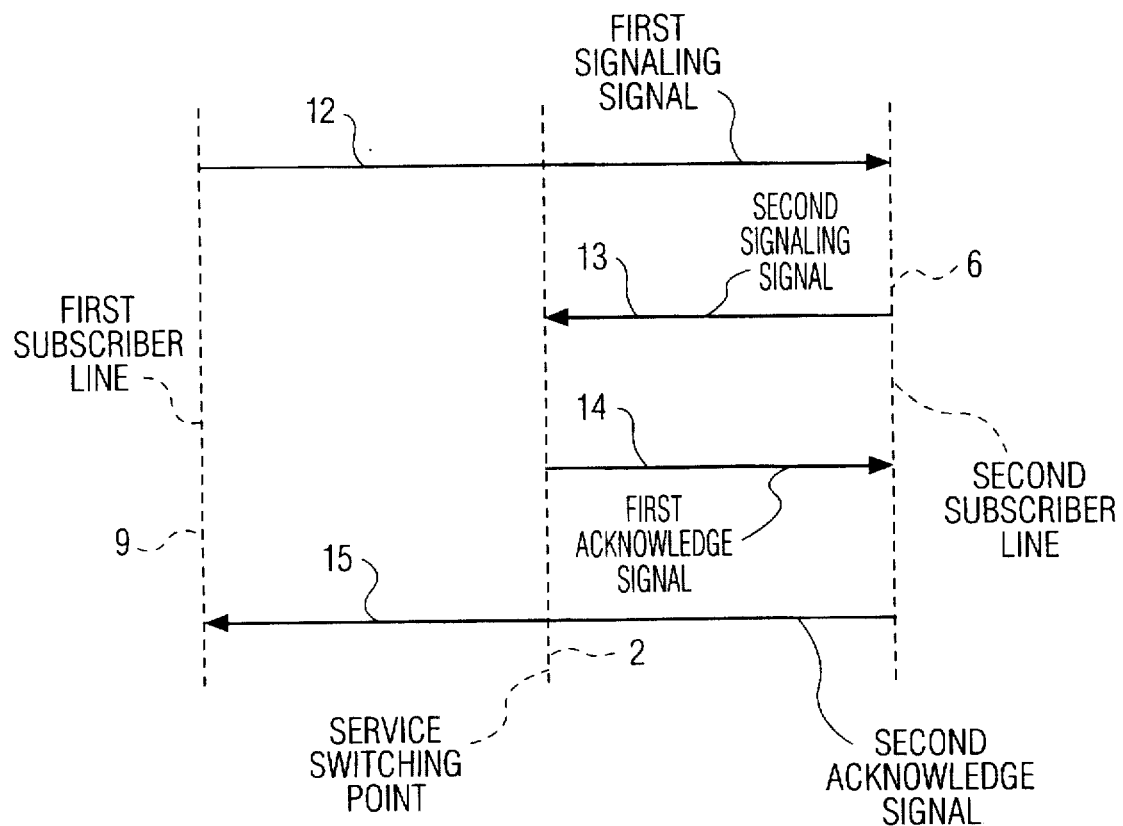
FIG. 2 shows a graphic representation of an operation of activating a service feature.

In the following the remote controlled activation of the service feature "call rerouting" will be further explained with reference to FIG. 2. First a connection between the two subscriber lines 9 and 6 via the switching network 1 is established, in that the first subscriber line 6 is called by the second user terminal 10 of the second subscriber line 9. Thereafter, the switching element 11 generates a first signalling signal 12 and this signal is transmitted, via the subscriber line 9, the switching network 1 and the subscriber line 6 to the first user terminal 7, where the switching element 8 receives this signalling signal 12. The switching element 8 influences as a converter the user terminal 7, so that this terminal generates a second signalling signal 13 derived from the first signalling signal and transmits this second signal to the service switching point 2. Subsequently, in the service switching point 2 the call rerouting is activated in such a way that calls destined for the first subscriber line 6 are rerouted to the third subscriber line (not shown). After the "call rerouting" has been activated, the service switching point 2 sends out a first acknowledge signal 14 to the first user terminal 7 after which the switching element 8 generates a second acknowledge signal 15 and sends same to the second subscriber line 9, or to the switching element 11 of the second user terminal 10. The possessor of the first subscriber line located at the second subscriber line 9 is then shown that the call rerouting has been activated.

Deactivating the call rerouting is effected completely by analogy with the described activation operation. Furthermore, it is possible to activate or deactivate with the described arrangement other service features such as, for example, blocking. The blocking, which also takes place in the service switching point, makes it possible that connections are no longer established from one subscriber line to specific predeterminable other subscriber lines.

The signalling signals 12 and 13 are to be structured as signalling information in such a way that the type of service feature and the call number of the third subscriber line can be derived from these signals. In addition, it should be detectable whether the service feature is to be activated or deactivated. Signalling information can be transmitted by utilizing different transmit frequencies such as used in dual tone multifrequency signalling or in digital networks with the aid of protocol elements.

The switching elements 8 and 11 can be integrated, on the one hand, with the user terminals. On the other hand, an embodiment for the switching elements 8 and 11 as a separate module is advantageous in that the switching elements 8 and 11 can be added-on in a simple and cost-effective manner to the user terminals 7 and 10. Switching elements 8 and 11 are then coupled electrically, acoustically or optically or by radio to a particular user terminal.

We claim:

1. Communication system comprising a first subscriber line for a first user terminal to which subscriber line a service feature functioning in a service switching point is assigned, which feature can be activated and/or deactivated by the service switching point from the first subscriber line by the first user terminal, characterized in that means are provided for remote control of the first user terminal by a second user terminal of a second subscriber line whereby the second terminal remotely controls the first terminal to activate and/or deactivate the service feature by the service switching point, in that means are provided for transmission of signaling information via a switching network from a second switching element of the second user terminal to a first switching element of the first user terminal to effect a transmission of signaling information from the first user terminal to the service switching point to activate and/or deactivate the service feature, and in that, after the service feature has been activated and/or deactivated, a transmission of a first acknowledge signal takes place from the service switching point to the first user terminal and means are provided for the subsequent transmission of a second acknowledge signal from the first user terminal to the second user terminal by the first and second switching elements.

2. Communication system as claimed in claim 1, characterized in that the first and second switching elements are provided as add-on elements for the first and second user terminals.

3. Switching element for a first and a second user terminal of a first and second subscriber line for a communication system as claimed in claim 1, in which the first subscriber line is assigned a service feature functioning in a service switching point, which feature can be activated and/or deactivated from the first subscriber line, and in which means are provided for a remote control of the first user terminal via a second user terminal of a second subscriber line by the switching element to activate and/or deactivate the service feature.

4. User terminal comprising a switching element as claimed in claim 3.

* * * * *